US006283498B1

(12) United States Patent
Breitweg

(10) Patent No.: US 6,283,498 B1
(45) Date of Patent: *Sep. 4, 2001

(54) GAS BAG MODULE WITH COVER

(75) Inventor: Kurt Breitweg, Mutlangen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,038

(22) Filed: Jun. 27, 2000

Related U.S. Application Data

(62) Division of application No. 09/218,854, filed on Dec. 21, 1998.

(30) Foreign Application Priority Data

Dec. 23, 1997 (DE) .......................................... 297 22 780 U

(51) Int. Cl.⁷ .................................................. B60R 21/20
(52) U.S. Cl. ................................ 280/728.3; 280/728.1; 280/728.2
(58) Field of Search .............................. 280/728.1–728.3

(56) References Cited

U.S. PATENT DOCUMENTS

| 3,973,650 | | 8/1976 | Nagazumi . | |
|---|---|---|---|---|
| 5,242,191 | * | 9/1993 | Faigle et al. .................... | 280/728.3 |
| 5,332,257 | * | 7/1994 | Rogers et al. ................... | 280/728.3 |
| 5,374,078 | | 12/1994 | Amamori et al. . | |
| 5,398,960 | | 3/1995 | Ravenberg et al. . | |
| 5,398,961 | * | 3/1995 | Rogers et al. .................... | 280/728.3 |
| 5,533,746 | * | 7/1996 | Whited ............................ | 280/728.2 |
| 5,613,348 | * | 3/1997 | Lunt et al. ........................ | 53/429 |
| 5,613,701 | * | 3/1997 | Bentley et al. ................... | 280/728.3 |
| 5,647,607 | * | 7/1997 | Bolieau ............................ | 280/728.2 |
| 5,651,562 | * | 7/1997 | Hagen et al. .................... | 280/728.3 |
| 5,653,461 | | 8/1997 | Fischer . | |
| 5,765,862 | * | 6/1998 | Bentley ............................ | 280/728.3 |
| 5,975,563 | * | 11/1999 | Gallagher et al. ............... | 280/728.3 |
| 6,131,943 | * | 10/2000 | Breitweg .......................... | 280/728.3 |
| 6,131,945 | * | 10/2000 | Labrie et al. .................... | 280/728.3 |

FOREIGN PATENT DOCUMENTS

| 0849126A1 | 6/1996 | (EP) . |
|---|---|---|
| 0774386A2 | 5/1997 | (EP) . |
| 1542968 | 10/1968 | (FR) . |
| 07069161 | 3/1995 | (JP) . |
| 07108891 | 4/1995 | (JP) . |
| 07323800 | 12/1995 | (JP) . |

* cited by examiner

Primary Examiner—J. J. Swann
Assistant Examiner—L. Lum
(74) Attorney, Agent, or Firm—Tarolli, Sundheim, Covell, Tummino & Szabo L.L.P.

(57) ABSTRACT

A gas bag module includes a housing for accommodating a folded gas bag, a cover connected to said housing by at least one tether and a fastener element on said housing for connection of said tether to said housing. To counteract extreme loading of the cover and other vehicle parts on deployment of the gas bag, said fastener element is plastically deformable when loaded by tensile forces in said tether as generated by inertial forces of said cover occurring on deployment of said gas bag.

2 Claims, 3 Drawing Sheets

GAS BAG MODULE WITH COVER

This application is a divisional of copending application Ser. No. 09/218,854 filed on Dec. 21, 1998.

FIELD OF THE INVENTION

The invention relates to a gas bag module, including a housing for accommodating a folded gas bag, and a cover connected to the housing by at least one tether.

BACKGROUND OF THE INVENTION

Gas bag modules in the field concerned are known. A gas bag module is arranged, for example, behind a dashboard panel and provided with a cover fitting optically into the dashboard panel. This cover needs to be sufficiently rugged so that it can withstand the loads during normal usage of the vehicle. It is especially covers having a large surface area, as used for instance in concealing front passenger gas bags, that thus have a considerable mass. When such a cover is totally released from the dashboard panel during the deployment action of the gas bag, it needs to be retained on the housing of the gas bag module by a tether, as a result of which in the course of the gas bag being deployed the cover is abruptly stopped so that solid fastener parts are required for securing the tether to the cover and housing which are capable of withstanding the high peak loads. Despite it being retained by means of a tether, the cover flying off after activation of the gas bag may also result in damage to the windscreen or other vehicle components.

SUMMARY OF THE INVENTION

The invention is thus intended to counteract extreme loading of the cover of a gas bag module and other vehicle parts on deployment of the gas bag.

In accordance with the invention, a gas bag module is provided for this purpose including a housing for accomodating a folded gas bag, and a cover connected to the housing by at least one tether, wherein a fastener element for the tether is applied to the housing, this fastener element being plastically deformable when affected by tensile forces occurring in the tether due to the mass inertia of the cover on activation of the gas bag. In this way the kinetic energy of the cover can be effectively depleted over a predetermined deformation travel of the fastener element so that, more particularly, damage to the windscreen is avoided. In addition, the peak loads occurring in the fastener element, tether and the connection of the tether to the cover are reduced, thus enabling a lighter and/or cheaper design of the tether and its connection. Arranging the plastically deformable fastener element on the housing instead of on the cover makes a lightweight design of the cover possible.

In a further development of the invention, the fastener element is formed by a bracket having a slot for looping in the tether, as a result of which the fastener element can be realized simply and cheaply, for example as a sheet-metal part. Connecting the fastener element and the tether via a slot and a loop is a reliable and simple design apprcach.

Preferably the bracket is bent at its base and stands at a predetermined angle to the direction of action of the tensile forces on commencement of the plastic deformation, these measures ensuring a controlled deformation of the fastener element.

In a further development of the invention it is provided for that the bracket stands at an angle of approximately 90° to the direction of action of the tensile force on completion of the plastic deformation. Thereby, an effective limitation of the deformation travel of the bracket is possible.

The deformation properties of the bracket can be controlled to advantage by the bracket being provided with indentations and/or recesses. To reinforce the bracket it can be beaded or profiled so that it presents a higher resistance to deformation. Achieving deformation of the bracket already at low forces is done by providing the bracket with a perforation, for example, in the portion being deformed.

BRIEF DESCRIPTION OF THE DRAWINGS

Further features and advantages of the invention read from the following description and from the drawing to which reference is made and in which.

DESCRIPTION OF THE PREFERRED EMBODIMENTS

Figure 1:
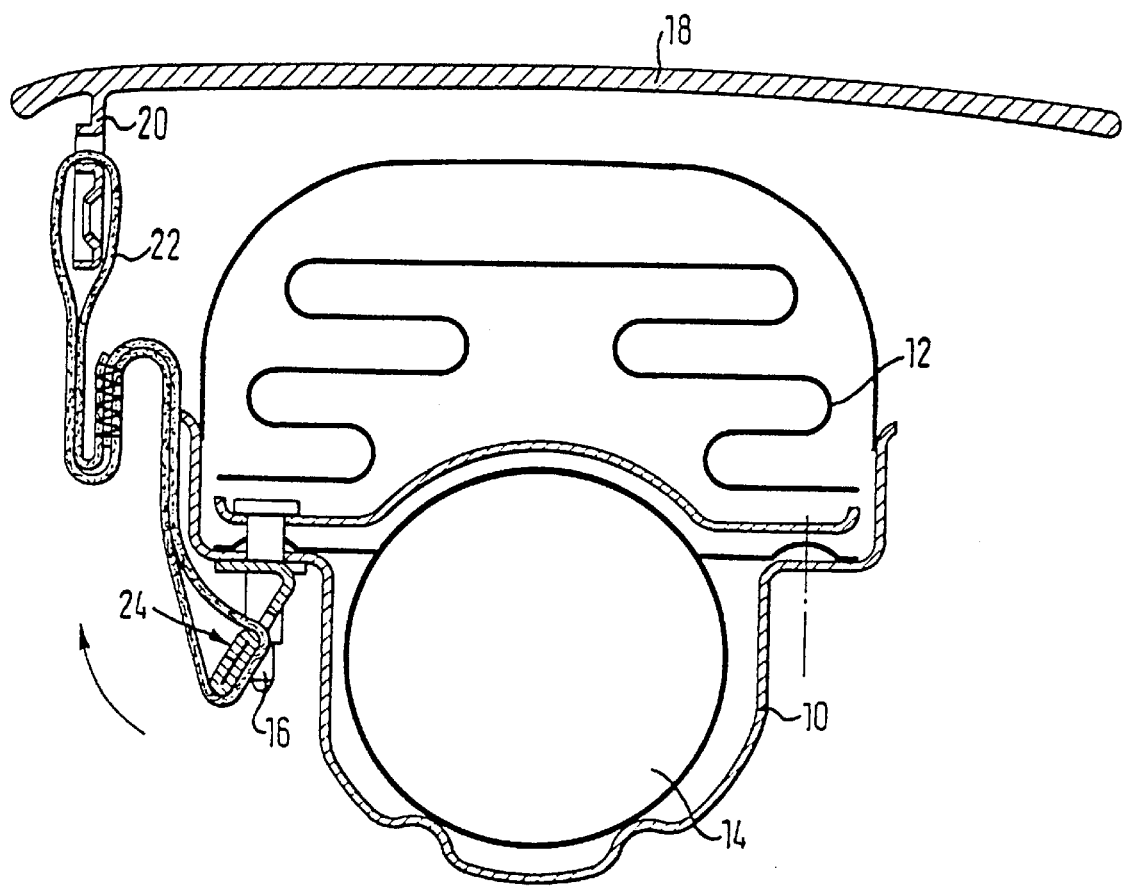
FIG. 1 is a section view of a gas bag module in accordance with the invention.

The gas bag module as shown in FIG. 1 comprises a housing in which a folded gas bag 12 and an inflator 14 are accommodated. By means of the fastener studs 16 the gas bag module is secured to a vehicle structure (not shown). A cover 18 conceals the gas bag module from the vehicle interior. The cover 18 comprises a connection 20 for a tether 22 which is connected to the gas bag module via a fastener element 24. The fastener element 24 is secured to a flange of the housing 10 facing away from the cover 18. When the inflator 14 is activated the gas bag 12 deploys and moves the cover 18 upwards thus making way for deployment of the gas bag 12, the latter becoming able to deploy for protecting the vehicle occupant. Once the cover 18 has gone a predetermined distance, the tether 22 is tensioned. Due to the abrupt acceleration of the cover 18 by the gas bag 12 on its deployment, the force of inertia of the cover 18 at this point in time is already so large that it causes, in conjunction with a lever arm dictated by the fastener element 24, a moment which is greater than a predetermined value. The fastener element 24 is accordingly deformed in the direction of the arrow as shown in FIG. 1. Due to this deformation of the fastener element 24 the kinetic energy of the cover 18 is depleted in a controlled manner, and as compared to a rigid fastening greatly reduced peak loads occur in the tether 22 and at its connections 20 and 24. If the cover 18 collides, for instance, with the windscreen in the course of deployment of the gas bag 12, its kinetic energy is already reduced to such an extent that damage to the windscreen is counteracted.

Figure 2:
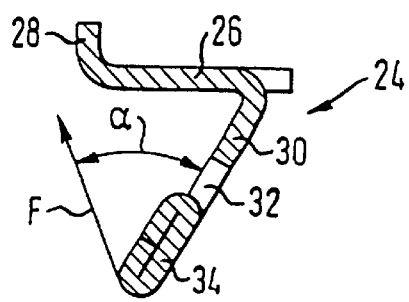
FIG. 2 is a section view of the fastener element as shown in FIG. 1.

Referring now to FIG. 2 there is shown a section view of the fastener element 24 as illustrated in FIG. 1. The fastener element 24 is configured as a bracket made of a simple bent piece of sheet-metal. A base 26 comprises a bent section 28 so that the bracket 24 can be safely applied to the housing 10 and secured thereto. The bracket 24 further comprises a bent-off web 30. The direction of action of the tensile forces occurring in the tether, also evident approximately from FIG. 1, on activation of the gas bag by the mass inertia of the cover, is indicated by an arrow F in FIG. 2. The bent-off web 30 of the bracket 24 forms an angle of approximately 55° to this direction of action. The direction of action and the dimensions of the bracket 24 are generally dictated by the installation conditions. Due to the angular position of the bracket 24 the force of inertia of the cover is effective over a lever length prompting a moment which ensures a controlled introduction of deformation of the bracket 24. The angular position of the bracket 24 in this arrangement is dictated by a compromise resulting from the requirement for a favorable lever length for the acting force of inertia and the necessary deformation travel. The bracket 24 is also provided with a slot 32 into which the tether is looped. The tether is thereby placed around a rounded bar 34 formed by bending the sheet-metal material of the bracket 24, as a result of which the transfer of force from the tether to the rounded bar 34 and thus to the bracket 24 is made over a large surface area so that loading of the tether is reduced.

Figure 3:
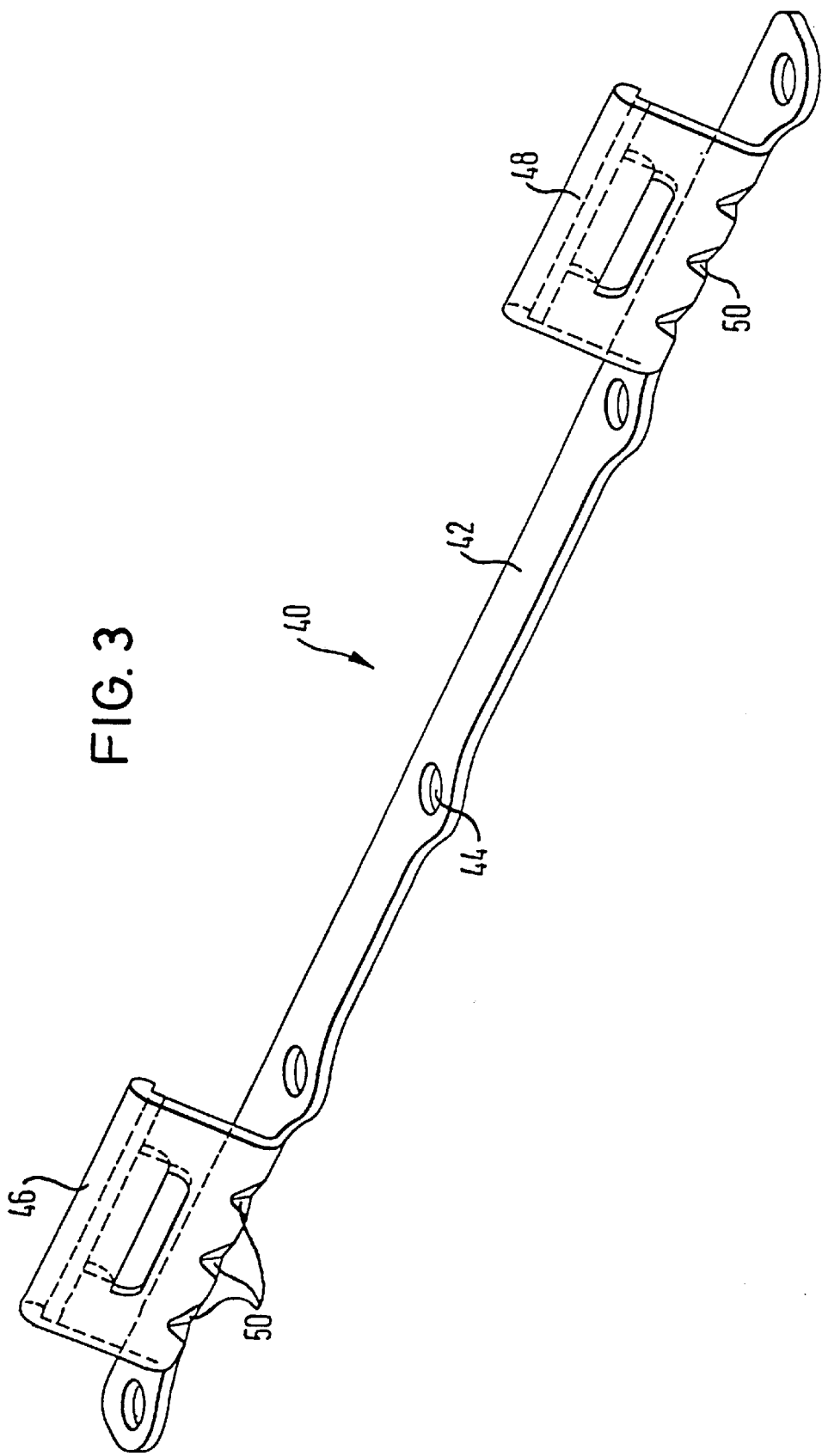
FIG. 3 illustrates a fastener element in accordance with a second embodiment of the invention.

Referring now to FIG. 3 there is shown a fastener element 40 in a second embodiment of the gas bag module in accordance with the invention. The fastener element 40 is configured similar to the fastener element as shown in FIGS. 1 and 2 and consists of a fastener strip 42 provided with holes 44. Via the holes 44 the fastener element 40 can be secured to a gas bag module. Formed on the fastener strip 42 are two webs 46 and 48, each of which is provided with a slot for receiving a respective tether. For gentle treatment of the tether both webs 46 and 48 comprise a slot having a rounded bar. In the region of the webs 46 and 48 their base is formed in each case by a section of the fastener strip 42. Both webs 46 and 48 are bent at their base and the region of the bend is provided with beads 50 at the outer surface area. The beads 50 stiffen the webs 46 and 48, respectively, so that they present a greater resistance to deformation.

Figure 4:
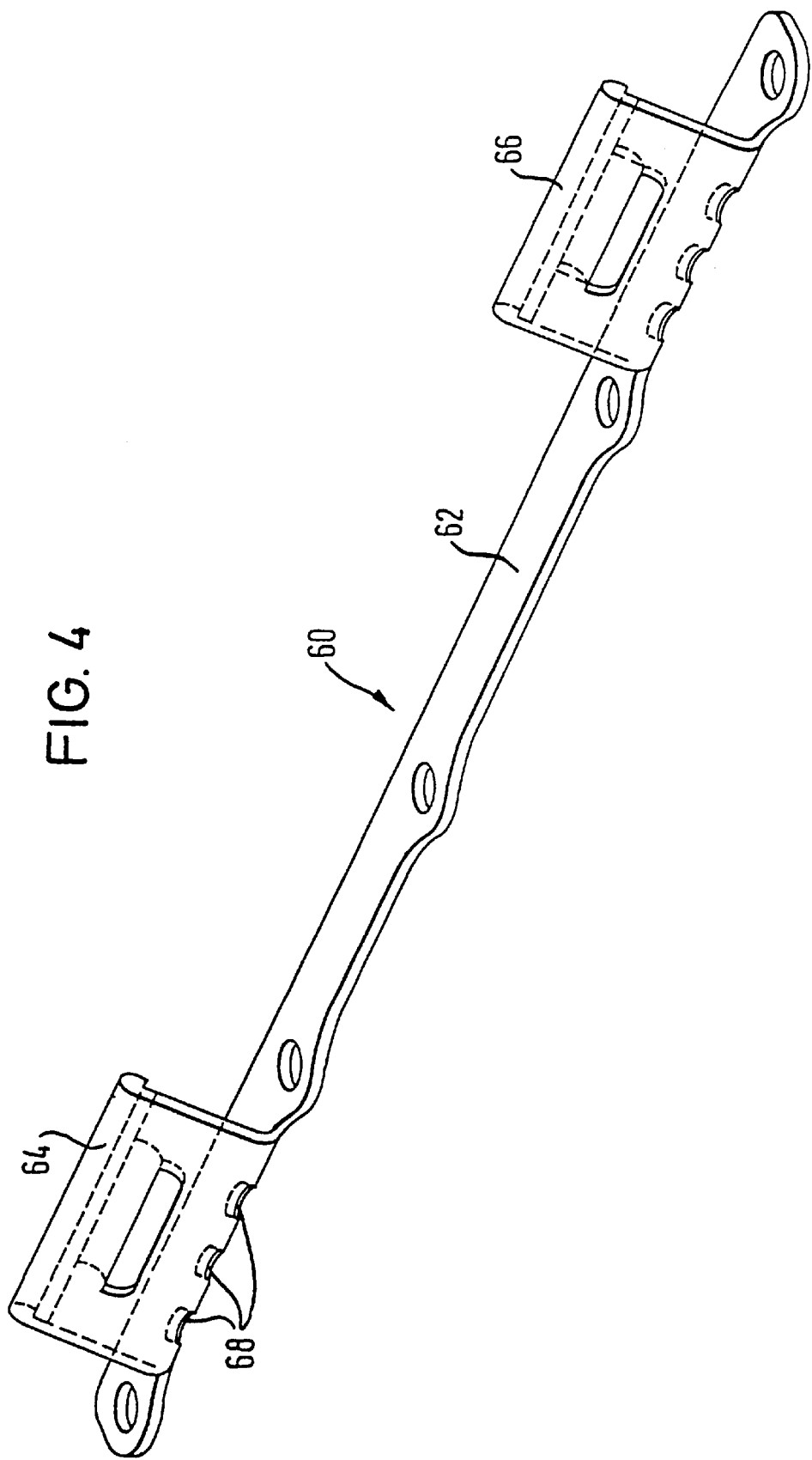
FIG. 4 illustrates a fastener element in accordance with a further embodiment of the invention.

Referring now to FIG. 4 there is shown a fastener element 60 configured similar to the fastener element as shown in FIG. 3, it comprising a fastener strip 62 including two webs 64 and 66 formed thereon. Each of the webs 64 and 66 is provided in the region of its bend with three holes in the form of a perforation, as a result of which the webs 64 and 66 are weakened in the region of their bend so that only a weak resistance to deformation is presented. With the aid of the fastener elements as shown in FIG. 3 and FIG. 4 it is thus possible to adapt the deformation properties to various assembly situations and covers.

What is claimed is:

1. A gas bag module including a housing for accommodating a folded gas bag, a cover connected to said housing by at least one tether and a fastener element on said housing for connection of said tether to said housing, said fastener element being plastically deformable when loaded by tensile forces in said tether as generated by inertial forces of said cover occurring on deployment of said gas bag.

2. A bag module including a housing for accommodating a folded gas bag, a cover connected to said housing by at least one tether and a fastener element on said housing to connect said tether to said housing, said fastener element being plastically deformed when subjected to tensile forces from said tether generated by inertial forces of said cover during deployment of said gas bag, said fastener element comprising a bracket having a base connected to the housing and a bent-off web integrally formed with said base and having a slot for looping in said tether, wherein said web is engaged by an end of said tether and oriented at a predetermined angle to a direction of tensile forces occurring in said tether upon deployment of said gas bag, said web being positioned approximately 90° to the direction of tensile forces within said tether upon completion of plastic deformation of the fastener element.

* * * * *